(12) United States Patent
Hsu et al.

(10) Patent No.: US 8,493,743 B2
(45) Date of Patent: Jul. 23, 2013

(54) HANDHELD DEVICE

(75) Inventors: Hsi-Hsing Hsu, Taoyuan County (TW); Tung-Lung Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 138 days.

(21) Appl. No.: 13/228,467

(22) Filed: Sep. 9, 2011

(65) Prior Publication Data

US 2013/0063904 A1   Mar. 14, 2013

(51) Int. Cl.
*H05K 5/00* (2006.01)
(52) U.S. Cl.
USPC ........... 361/759; 361/752; 361/732; 361/740; 257/678

(58) Field of Classification Search
USPC ........... 361/759, 752, 732, 740, 747; 257/678
See application file for complete search history.

(56) References Cited

U.S. PATENT DOCUMENTS

| | | |
|---|---|---|
| 7,660,560 B2 | 2/2010 | Zuo et al. |
| 7,933,123 B2 | 4/2011 | Wang et al. |
| 2011/0003623 A1 | 1/2011 | Na et al. |

*Primary Examiner* — Timothy Thompson
*Assistant Examiner* — Andargie M Aychillhum
(74) *Attorney, Agent, or Firm* — Jianq Chyun IP Office

(57) ABSTRACT

A handheld device includes a body, a back cover and a latch mechanism. The body has a back portion. The back cover coves the back portion. The latch mechanism is disposed between the body and the back portion to lock the back portion to the body. Reliving the lock connection between the body and the back cover performed by the latch mechanism causes the back cover is able to depart from the body.

9 Claims, 3 Drawing Sheets

HANDHELD DEVICE

BACKGROUND OF THE DISCLOSURE

1. Field of the Disclosure

The present disclosure relates to a handheld device, and in particular, to a handheld device with a back cover disposed at a back portion of a body.

2. Description of Related Art

A handheld device refers to an electronic device that can be held and operated by a user with a hand, such as a mobile phone, a multimedia player, a personal digital assistant, a palmtop computer, a palmtop game device and a handheld satellite navigator. Such electronic devices are usually small and light, and convenient for the user to carry.

Taking the mobile phone as an example, for the convenience of mounting or replacing external components such as a battery, a Subscriber Identity Model (SIM) card or a micro memory card, a corresponding connector or terminal set is disposed at a back portion of a body of the mobile phone, and a back cover of the mobile phone is mounted to the back portion of the body, so as to protect the foregoing components. At the same time, an external outline of the back cover may also be designed in coordination with an outline of the body, in order to demonstrate an overall shape of the mobile phone.

In order to fix the back cover of the mobile phone to the back portion of the body in a dismountable manner, a latch mechanism and one or more hook couples are generally disposed between the body and the back cover. Therefore, after locking of the latch mechanism and clamping of the hook couples are relieved, the user is able to remove the back cover from the body.

However, relief of the locking of the latch mechanism, relief of the clamping of the hook couples and the removing of the back cover from the body at the same time increase difficulty of dismantling the back cover. In addition, after lock connection is relieved, the back cover and the body lack a point of force disclosure (a position where the user applies force by hand), which also increases difficulty of dismantling the back cover.

SUMMARY OF THE DISCLOSURE

The present disclosure is directed to a handheld device, in which a body and a back cover can automatically depart from each other after lock connection is relieved.

The present disclosure provides a handheld device, which includes a body, a back cover and a latch mechanism. The body has a back portion. The back cover covers the back portion. The latch mechanism is disposed between the body and the back cover, so as to lock the back cover to the body. Relief of lock connection between the body and the back cover applied by the latch mechanism enables the back cover to depart from the body.

Based on the above description, when the lock connection between the body and the back cover applied by the latch mechanism is relieved, an elastic member between the body and the back cover pushes the body away from the back cover, so that a user can dismantle the back cover from the body by hand.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
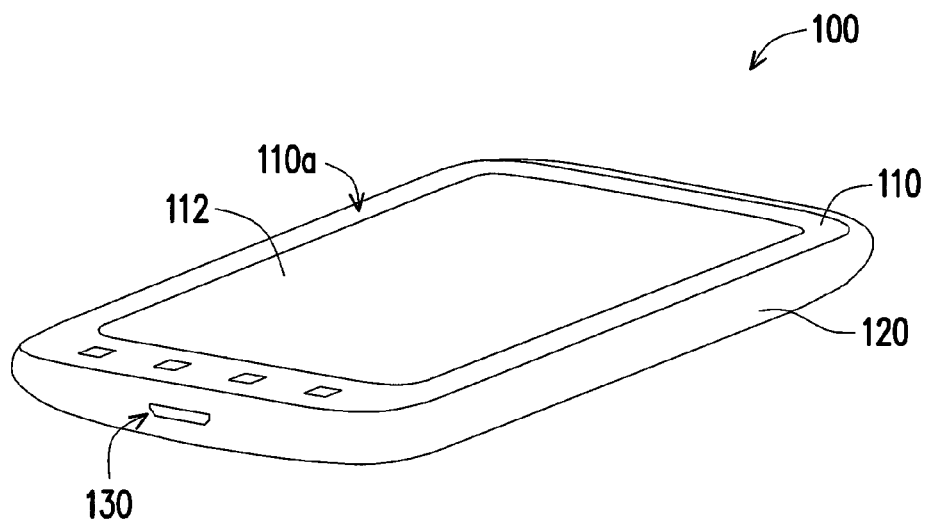
FIG. 1A is a perspective view of a handheld device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
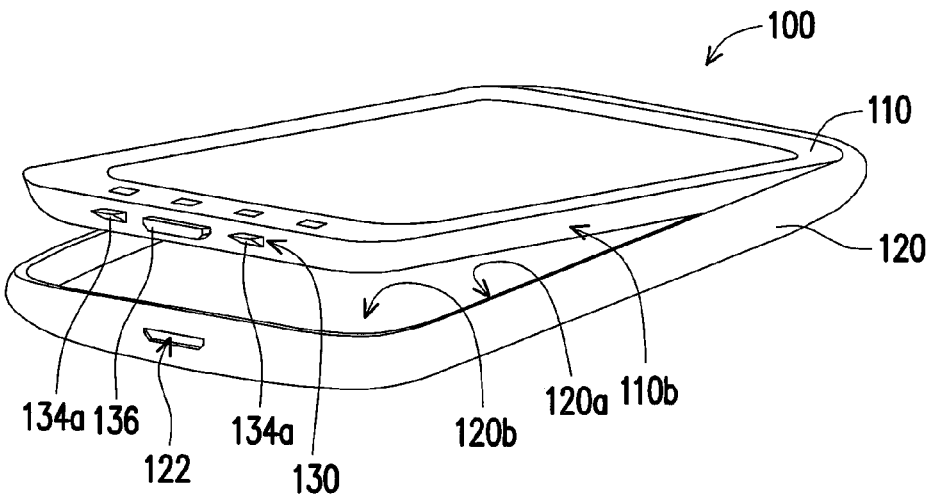
FIG. 1B is a perspective view of a back cover departing from a body of a handheld device of FIG. 1A.

FIG. 1A is a perspective view of a handheld device according to an embodiment of the present disclosure, and FIG. 1B is a perspective view of a back cover departing from a body of a handheld device of FIG. 1A. Referring to FIG. 1A and FIG. 1B, a handheld device 100 of this embodiment is a mobile phone, but the present disclosure is not limited thereto. The handheld device 100 includes a body 110 and a back cover 120, and the back cover 120 is mounted to the body 110, so as to cover a back portion 110b of the body 110 (referring to FIG. 1B).

Referring to FIG. 1A, the handheld device 100 further includes a latch mechanism 130. The latch mechanism 130 is disposed between the body 110 and the back cover 120, so as to lock the back cover 120 to the body 110. Therefore, when the latch mechanism 130 is triggered, lock connection between the body 110 and the back cover 120 applied by the latch mechanism 130 is relieved, which enables the back cover 120 to depart from the body 110.

Figure 2:
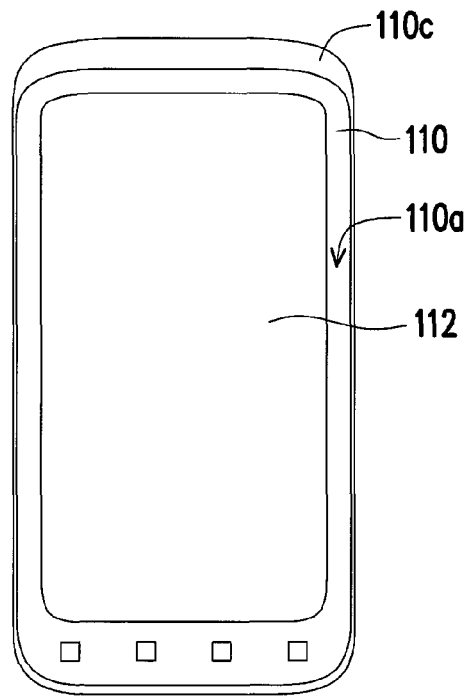
FIG. 2 is a front view of a body and other members of a handheld device of FIG. 1.
Figure 3:
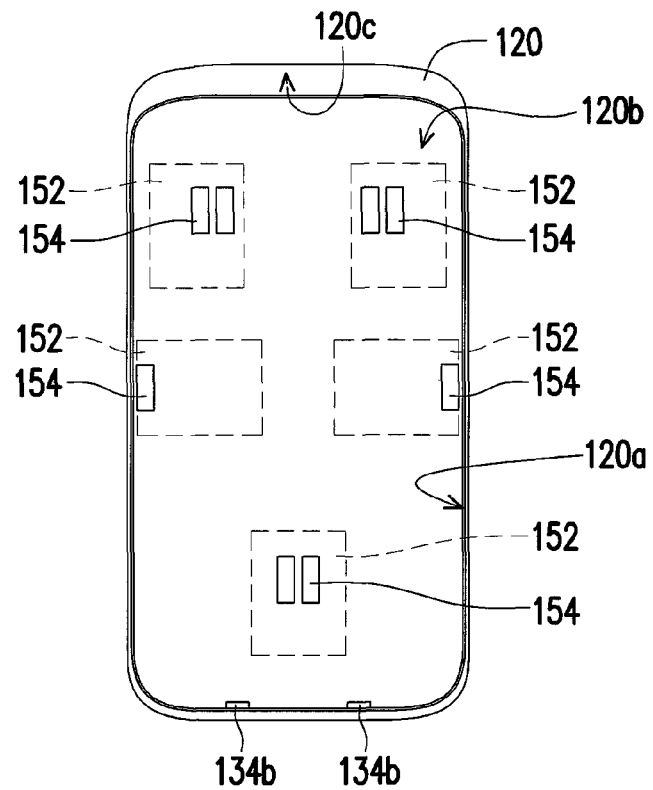
FIG. 3 is a front view of a back cover and other members of a handheld device of FIG. 1.
Figure 5:
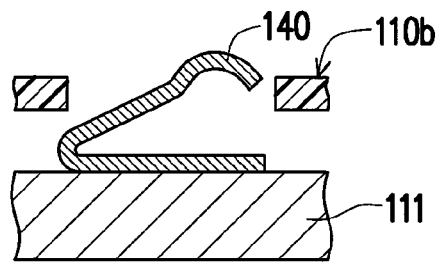
FIG. 5 is a sectional view along Line I-I of a body and an elastic member of a handheld device of FIG. 4.

FIG. 2 is a front view of a body and other members of a handheld device of FIG. 1, and FIG. 3 is a front view of a back cover and other members of the handheld device of FIG. 1. Referring to FIG. 1B, FIG. 2 and FIG. 3, the body 110 has a front surface 110a and a display 112. The front surface 110a is away from the back portion 110b, and the display 112 is disposed at the front surface 110a. In addition, the body 110 further includes components such as a circuit board 111 (as shown in FIG. 5) and a battery 114a (also as shown in FIG. 5). The back cover 120 may cover the back portion 110b of the body 110. In this embodiment, a periphery 120a of the back cover 120 may surround and be flush with the front surface 110a of the body 110.

Figure 4:
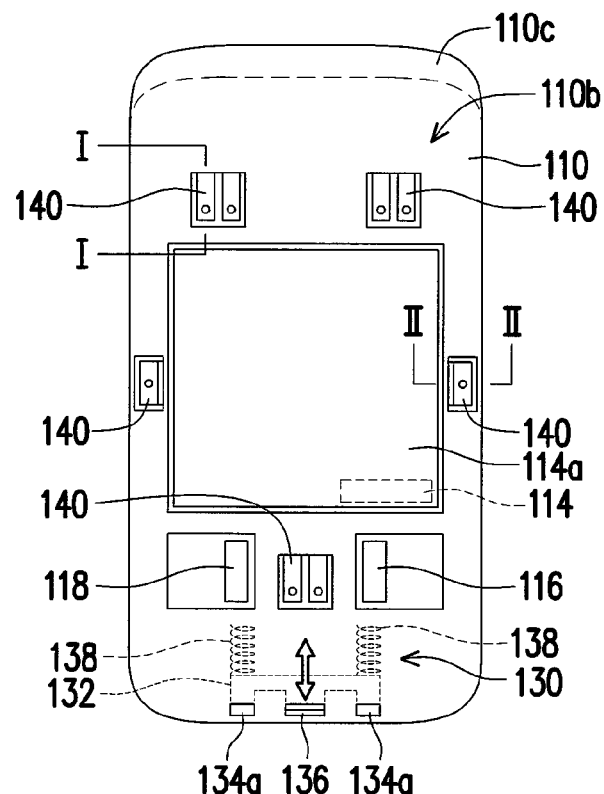
FIG. 4 is a back view of a body and other members of a handheld device of FIG. 2.

FIG. 4 is a back view of a body and other members of a handheld device of FIG. 2. Referring to FIG. 4, in order to enable the back cover 120 to automatically remove from the back portion 110b of the body 110, the handheld device 100 further includes one or more elastic members 140, and the elastic members 140 are disposed between the body 110 and the back cover 120. In this embodiment, the elastic members 140 are disposed on the back portion 110b of the body 110. When the latch mechanism 130 is triggered to relieve the lock connection between the body 110 and the back cover 120 applied by the latch mechanism 130, the elastic members 140 with accumulated strain can automatically push the body 110 away from the back cover 120, so that the user can dismantle the back cover 120 from the body 110. For a state of pushing the body 110 away from the back cover 120, references may be made to FIG. 1B.

Figure 6:
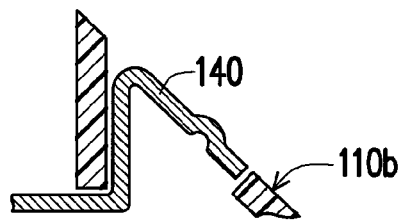
FIG. 6 is a sectional view along Line II-II of a body and an elastic member of a handheld device of FIG. 4.

FIG. 5 is a sectional view along Line I-I of a body and an elastic member of a handheld device of FIG. 4, and FIG. 6 is a sectional view along Line II-II of a body and an elastic member of the handheld device of FIG. 4. Referring to FIG. 5 and FIG. 6, in this embodiment, the elastic members 140 may be elastic terminals, and are mounted to the body 110 (for example, the circuit board 111 of the body 110 in FIG. 5) through welding or clamping. The elastic members 140 may further protrude from the back portion 110b of the body 110, so as to apply force to an inner surface 120b (marked in FIG. 3) of the back cover 120 relative to the body 110.

Referring to FIG. 3 and FIG. 4, in this embodiment, in order to provide wireless transmission, the handheld device 100 may further include multiple antennas 152 and multiple connection pads 154. The antennas 152 are embedded into the back cover 120, and the connection pads 154 are disposed on the back cover 120 and are respectively coupled to the corresponding antennas 152. When the back cover 120 is mounted to the body 110, the elastic members 140 respectively contact the connection pads 154. Therefore, the antennas 152 may be electrically coupled to the circuit board 111 of the body 110 through the connection pads 154 and the elastic members 140.

Referring to FIG. 1B, FIG. 3 and FIG. 4, in this embodiment, the latch mechanism 130 may include a sliding member 132, one or more first hook portions 134a and one or more second hook portions 134b. As shown in FIG. 4, the sliding member 132 is disposed on the body 110 in a sliding manner, and the first hook portions are fixed to the sliding member 132, so as to slide together with the sliding member 132. As shown in FIG. 5, the second hook portions 134b are fixed to the back cover 120, so as to be fastened to the first hook portions 134a.

In addition, the latch mechanism 130 may further include a press portion 136, and the press portion 136 is fixed to the sliding member 132, so as to slide together with the sliding member 132. The back cover 120 has an opening 122 to expose the press portion 136, so that the user can press with fingers easily. In addition, the latch mechanism 130 may further include one or more reset members 138, and the reset members 138 are disposed between the body 110 and the sliding member 132, so as to reset the sliding member 132 to an initial position relative to the body 110.

Referring to FIG. 2 and FIG. 3, in this embodiment, in order to assist the latch mechanism 130 of FIG. 4 in locking the back cover 120 to the body 110, the body 110 may have a fit protruding portion 110c; the back cover 120 may have a fit concave portion 120c, and the fit protruding portion 110c may be fit with the fit concave portion 120c. When the fit protruding portion 110c is inserted into the fit concave portion 120c, and the body 110 revolves with the fit protruding portion 110c as a revolving axis and is embedded into the back cover 120, the back cover 120 is mounted to the body 110 through fit connection between the fit protruding portion 110c and the fit concave portion 120c and lock connection between the body 110 and the back cover 120 applied by the latch mechanism 130.

Referring to FIG. 4, in this embodiment, the body 110 may have one or more connectors, such as a battery connector 114, a SIM card connector 116 and a memory card connector 118. The connectors are all located at the back portion 110b of the body 110, so as to be protected by the back cover 120 of FIG. 1A.

In conclusion, in the present disclosure, when the lock connection between the body and the back cover applied by the latch mechanism is relieved, the elastic member between the body and the back cover pushes the body away from the back cover, so that the user can dismantle the back cover from the body by hand.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A handheld device, comprising: a body comprising a back portion; a back cover covering the back portion; and a latch mechanism disposed between the body and the back cover to lock the back cover to the body, wherein relief of lock connection between the body and the back cover applied by the latch mechanism enables the back cover to depart from the body, wherein the body comprises a fit protruding portion, and the back cover comprises a fit concave portion; when the fit protruding portion is inserted into the fit concave portion, and the body revolves with the fit protruding portion as a revolving axis and is embedded into the back cover, the back cover is mounted to the body through fit connection between the fit protruding portion and the fit concave portion and the lock connection between the body and the back cover.

2. The handheld device according to claim 1, wherein the body further comprises a circuit board and a battery.

3. The handheld device according to claim 1, further comprising:
an elastic member disposed between the body and the back cover, wherein when the lock connection between the body and the back cover applied by the latch mechanism is relieved, the elastic member pushes the body away from the back cover relative to the back cover.

4. The handheld device according to claim 3, further comprising:
an antenna embedded into the back cover; and
a connection pad disposed on the back cover and coupled to the antenna, wherein the body further comprises a circuit board, the elastic member is an elastic terminal, the elastic member is configured on the circuit board, and when the back cover is mounted to the body, the elastic member contacts the connection pad.

5. The handheld device according to claim 1, wherein the latch mechanism comprises:
a sliding member disposed on the body in a sliding manner;
a first hook portion fixed to the sliding member to slide together with the sliding member; and
a second hook portion fixed to the back cover to be fastened to the first hook portion.

6. The handheld device according to claim 5, wherein the latch mechanism further comprises:
a press portion fixed to the sliding member to slide together with the sliding member, wherein the back cover comprises an opening to expose the press portion.

7. The handheld device according to claim 5, wherein the latch mechanism further comprises:
a reset member disposed between the body and the sliding member, so as to reset the sliding member to an initial position relative to the body.

8. The handheld device according to claim 1, wherein the body comprises a front surface and a display, the front surface is away from the back portion, and the display is disposed on the front surface.

9. The handheld device according to claim 8, wherein a periphery of the back cover surrounds and is flush with the front surface of the body.

* * * * *